(12) United States Patent
Kemmer et al.

(10) Patent No.: US 12,407,007 B2
(45) Date of Patent: Sep. 2, 2025

(54) METHOD FOR OPERATING A FUEL CELL SYSTEM AND CONTROL DEVICE FOR SAME

(71) Applicant: Robert Bosch GmbH, Stuttgart (DE)

(72) Inventors: Helerson Kemmer, Vaihingen (DE); Ingo Brauer, Vaihingen (DE); Felix Guenther, Stuttgart (DE); Michael Schmidt, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 75 days.

(21) Appl. No.: 17/773,133

(22) PCT Filed: Oct. 13, 2020

(86) PCT No.: PCT/EP2020/078740
§ 371 (c)(1),
(2) Date: Apr. 29, 2022

(87) PCT Pub. No.: WO2021/083660
PCT Pub. Date: May 6, 2021

(65) Prior Publication Data
US 2024/0186548 A1 Jun. 6, 2024

(30) Foreign Application Priority Data
Oct. 29, 2019 (DE) ............... 10 2019 216 656.3

(51) Int. Cl.
*H01M 8/04* (2016.01)
*H01M 8/04082* (2016.01)
(Continued)

(52) U.S. Cl.
CPC ... *H01M 8/04462* (2013.01); *H01M 8/04097* (2013.01); *H01M 8/04201* (2013.01); *H01M 8/0447* (2013.01); *H01M 8/04761* (2013.01)

(58) Field of Classification Search
CPC ......... H01M 8/04462; H01M 8/04097; H01M 8/04201; H01M 8/0447; H01M 8/04761
See application file for complete search history.

(56) References Cited

U.S. PATENT DOCUMENTS

| | | | |
|---|---|---|---|
| 2004/0013919 A1 | 1/2004 | Ueda et al. | |
| 2005/0214603 A1* | 9/2005 | Barton | H01M 8/04798 429/513 |

(Continued)

FOREIGN PATENT DOCUMENTS

| | | |
|---|---|---|
| DE | 102005058830 A1 | 6/2007 |
| DE | 102005058832 A1 | 6/2007 |

(Continued)

OTHER PUBLICATIONS

Translation of International Search Report for Application No. PCT/EP2020/078740 dated Jan. 20, 2021 (2 pages).

*Primary Examiner* — Raymond Alejandro
(74) *Attorney, Agent, or Firm* — Michael Best & Friedrich LLP

(57) ABSTRACT

The invention relates to a method for operating a fuel cell system (1), in particular a PEM fuel cell system, in which at least one fuel cell (2) is supplied with a hydrogen-containing anode gas via an anode gas path (3) and anode gas exiting the fuel cell (2) is returned via a recirculation path (4), wherein, in order to reduce a nitrogen content in the anode gas, a flush valve (5) arranged in the recirculation path (4) is opened and the recirculation path (4) is flushed. According to the invention, the hydrogen content of the anode gas is determined using at least one sensor (6) and used as a control variable when controlling the flushing of the recirculation path (4). The invention also relates to a control device (10) for carrying out the method according to the invention.

9 Claims, 1 Drawing Sheet

(51) Int. Cl.
*H01M 8/04089* (2016.01)
*H01M 8/0444* (2016.01)
*H01M 8/04746* (2016.01)

(56) References Cited

U.S. PATENT DOCUMENTS

2006/0134478 A1 6/2006 Fuse
2008/0176116 A1* 7/2008 Hayashi ............ H01M 8/04552
429/513

FOREIGN PATENT DOCUMENTS

| | | |
|---|---|---|
| JP | 2004161543 A | 6/2004 |
| JP | 2005044736 A | 2/2005 |
| JP | 2005203143 A | 7/2005 |
| JP | 2005339845 A | 12/2005 |
| JP | 2008091243 A | 4/2008 |
| JP | 2009037951 A | 2/2009 |
| JP | 2009110850 A | 5/2009 |
| JP | 2010067573 A | 3/2010 |
| JP | 2010153247 A | 7/2010 |
| JP | 2012182096 A | 9/2012 |
| JP | 2019110031 A | 7/2019 |

* cited by examiner

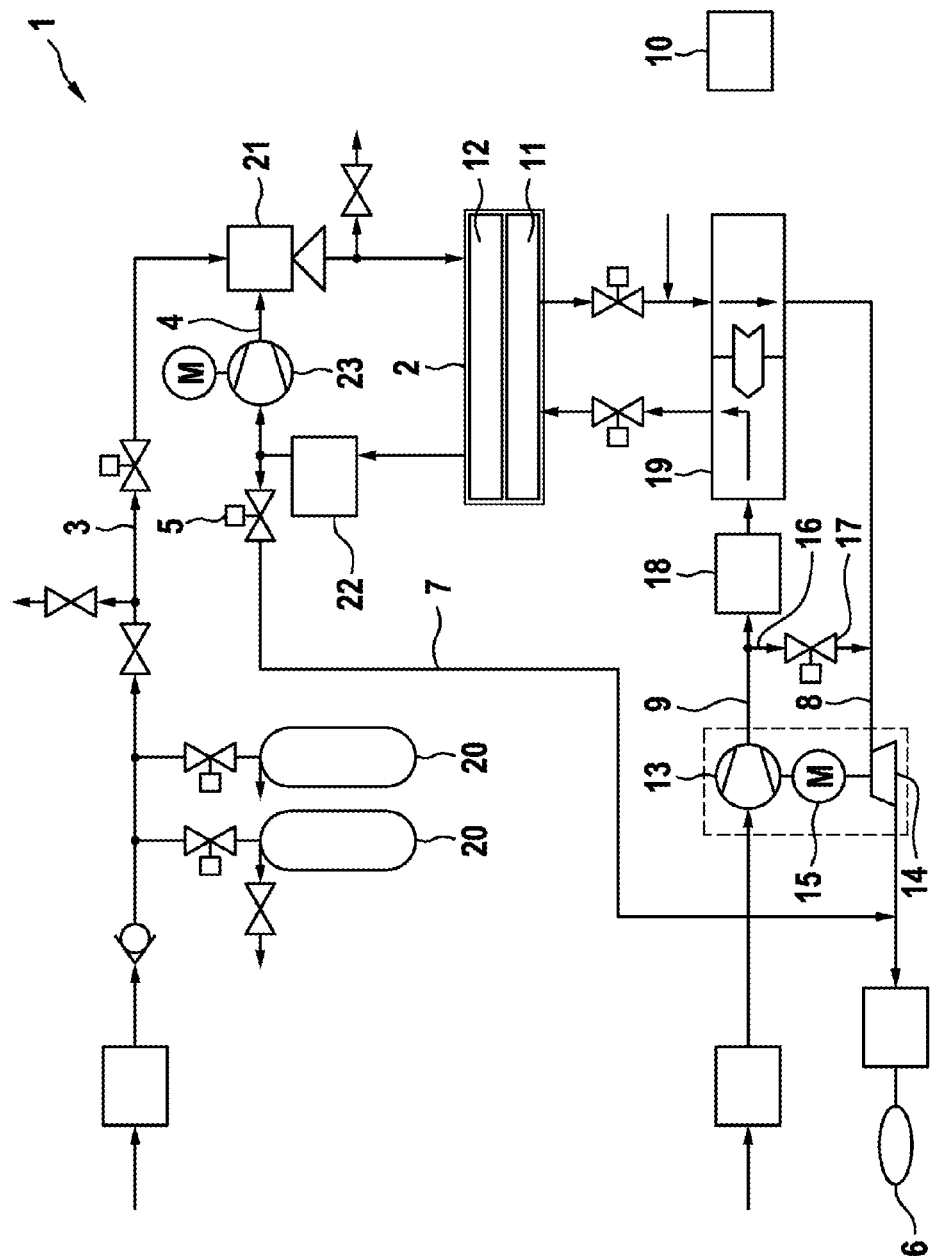

METHOD FOR OPERATING A FUEL CELL SYSTEM AND CONTROL DEVICE FOR SAME

BACKGROUND OF THE INVENTION

The invention relates to a method for operating a fuel cell system, in particular a PEM fuel cell system. The invention further relates to a control device which makes it possible to carry out the method according to the invention.

With the aid of a fuel cell system of the type mentioned above, chemical energy can be converted into electrical energy using hydrogen and oxygen. To this end, the fuel cell system comprises at least one fuel cell having an anode, a cathode and an electrolyte arranged between the anode and the cathode. If a polymer membrane (PEM="Proton Exchange Membrane") is used as electrolyte, the fuel cell is a PEM fuel cell or a PEM fuel cell system.

Electrical energy which is obtained with the aid of a fuel cell system can be used as drive energy, for example to drive a vehicle. In this case, the hydrogen required is carried on board the vehicle in a suitable tank. The oxygen also required is taken from the ambient air.

During operation of a fuel cell system, the fuel cells age, especially through thinning of the membranes and/or through reduction of the effectiveness of platinum coatings. As a result, the amount of nitrogen that diffuses from the cathode side to the anode side increases over the service life of the fuel cells. This changes the ratio of nitrogen to hydrogen in the anode region, specifically to the detriment of the hydrogen content. The efficiency of the fuel cell system accordingly drops.

To counteract this, in particular to minimize the proportion of nitrogen in the anode gas, the anode region is regularly flushed. However, during flushing, it is not only nitrogen that is removed from the anode region, but also hydrogen, thereby increasing hydrogen consumption. If the fuel cell system is being used to drive a vehicle, this is associated with a decreased range of the vehicle.

SUMMARY OF THE INVENTION

It is therefore an object of the present invention to lower hydrogen consumption during operation of a fuel cell system.

In the proposed method for operating a fuel cell system, in particular a PEM fuel cell system, a hydrogen-containing anode gas is supplied to at least one fuel cell via an anode gas path and anode gas exiting from the fuel cell is recycled via a recirculation path. A flush valve arranged in the recirculation path is opened and the recirculation path is flushed for reduction of a proportion of nitrogen contained in the anode gas. According to the invention, the hydrogen content of the anode gas is determined with the aid of at least one sensor and is used as a control variable in controlling the flushing of the recirculation path.

The recirculation path is thus flushed in a controlled manner. The control ensures that the recirculation path is only flushed when required. This is the case when the hydrogen content of the anode gas falls short of a specified limit value. Only then is a flushing operation initiated. In this way, the number of flushing operations can be lowered. The losses in hydrogen associated with flushing consequently decrease, meaning that hydrogen consumption drops and the range of a vehicle driven with the aid of the fuel cell system increases.

Furthermore, it is ensured that a minimum content of hydrogen is present in the anode gas, since the hydrogen content is monitored for flushing at the right time.

To determine or monitor the hydrogen content of the anode gas, preference is given to using a hydrogen sensor. Hydrogen sensors are already known from the prior art. By way of example, reference is made to the laid-open applications DE 10 2005 058 830 A1 and DE 10 2005 058 832 A1, these being earlier applications from the same applicant. The sensors that they describe can also be used in the presently described method.

Preferably, the hydrogen content of the anode gas is determined with the aid of a sensor arranged in the recirculation path or in a flush path connectable to the recirculation path via the flush valve. This means that the hydrogen content of the anode gas is determined on the exit side of the at least one fuel cell. Since the exiting anode gas is resupplied to the anode gas path via the recirculation path and since the hydrogen content of the anode gas in the anode gas path upstream of the point where the anode gas is introduced from the recirculation path is known, it is possible on the basis of these variables to determine the hydrogen content of the anode gas downstream of the point where the recirculation path is introduced into the anode gas path. Said hydrogen content must be adequately measured so that the efficiency of the at least one fuel cell is ensured.

As an alternative or additional proposal, the hydrogen content of the anode gas is determined with the aid of a sensor arranged in a cathode waste gas path directly connectable to the recirculation path via the flush valve or indirectly connectable to the recirculation path via the flush path. What is generally discharged via the cathode waste gas path is the cathode waste gas of the at least one fuel cell, the waste gas—primarily air, the oxygen content of which has been reduced as a result of the reaction in the fuel cell, and water—being released back to the environment. Since the cathode waste gas can, however, also contain other constituents, for example hydrogen, the composition of the cathode waste gas is monitored with the aid of at least one sensor, for example with the aid of a hydrogen sensor, before the release of the cathode waste gas to the environment. In this case, a sensor already present can be used for determination of the hydrogen content of the anode gas, meaning that possibly an additional sensor for performance of the method according to the invention is unnecessary. It is merely necessary to establish via the flush valve—if not already present—a connection of the recirculation path to the cathode waste gas path, either directly or indirectly via a flush path.

In the case of use of a sensor arranged in the cathode waste gas path, a gas mixture consisting of cathode waste gas and anode gas from the recirculation path is admitted to the sensor. In order to determine the hydrogen content of the anode gas, the proportion of anode gas in the gas mixture is determined beforehand.

The proportion of anode gas in the gas mixture in the cathode waste gas path can be determined in various ways.

For example, the molar mass of the anode gas can be derived from the pressure difference between the pressures in the recirculation path and in the cathode waste gas path, the flow cross section of the cathode waste gas path and the temperature in the cathode waste gas path for determination of the proportion of anode gas in the gas mixture.

Preferably, the proportion of cathode waste gas in the gas mixture is also determined in addition to determination of the proportion of anode gas in the gas mixture. Here, the molar mass of the cathode gas is preferably derived from the current operating point and the set and/or measured air mass supplied to the at least one fuel cell via a cathode gas path. The molar mass of the cathode gas in the cathode gas path in turn provides information about the amount of cathode waste gas discharged via the cathode waste gas path. The proportion of cathode waste gas in the gas mixture can accordingly be determined therefrom.

Advantageously, the hydrogen content of the anode gas is determined at regular time intervals. This means that the hydrogen content is monitored so that a prompt response can be made if the hydrogen content falls short of a specified limit value. In particular, the recirculation path can be flushed in order to remove nitrogen contained in the anode gas from the system and to thereby keep the hydrogen content at a specific level. If the specified limit value is not fallen short of, the next flushing operation can be postponed, which helps to lower hydrogen consumption, since hydrogen is always also discharged from the system with the nitrogen.

The method according to the invention is preferably carried out with the aid of a control device, so that a high degree of automation requiring no external intervention is achieved.

In the context of the present invention, what is therefore further proposed is a control device configured to execute the method according to the invention. In particular, the control device can be data-transmittingly connected to the at least one sensor for determination of the hydrogen content of the anode gas, so that the sensor forwards its data to the control device. Further preferably, the control device is connected to the flush valve via control lines, so that—depending on the evaluation of the sensor data—the flush valve is opened in order to initiate a flushing operation.

BRIEF DESCRIPTION OF THE DRAWING

The invention will be more particularly elucidated below on the basis of the appended drawing.

FIG. 1 illustrates a schematic depiction of a fuel cell system according to the invention.

DETAILED DESCRIPTION

The fuel cell system 1 depicted schematically in FIG. 1 is used to drive a vehicle. It comprises at least one fuel cell 2 or multiple fuel cells 2 in a stacked arrangement. Air is supplied as cathode gas to a cathode 11 of the fuel cell system 1 via a cathode gas path 9, whereas hydrogen is supplied as anode gas to an anode 12 of the fuel cell system 1 via an anode gas path 3.

The air supplied to the cathode 11 is taken from the environment. The air is compressed beforehand with the aid of a compressor 13 arranged in the cathode gas path 9. In the present case, the air is cooled again after compression by means of a cooler 18 likewise arranged in the cathode gas path 9 and is additionally humidified with the aid of a downstream humidifier 19. However, the cooling and/or humidification of the air is/are not absolutely necessary, and so the provision of a cooler 18 and/or a humidifier 19 is merely optional.

Cathode waste gas exiting from the at least one fuel cell 2 is discharged via a cathode waste gas path 8. In this connection, the cathode waste gas can—as in the example depicted—be supplied to a waste gas turbine 14 which is arranged in the cathode waste gas path 8 and which supports an electric motor 15 for driving the compressor 13 arranged in the cathode gas path 9. Furthermore, in the example depicted, the cathode gas path 9 and the cathode waste gas path 8 can be connectable via a bypass path 16 depending on the switch position of a bypass valve 17.

The hydrogen serving as anode gas is stored in tanks 20 and is supplied to the anode 12 via an anode gas path 3 in which a suction jet pump 21 is arranged in the present case. Anode gas exiting back out of the at least one fuel cell 2 is recycled into the anode gas path 3 via a recirculation path 4, and so it is not lost from the system. To this end, the recirculation path 4 can—as depicted—have a recirculation fan 23 arranged therein.

Since the anode gas is enriched over time with nitrogen diffusing from the cathode region into the anode region, the recirculation path 4 must be flushed from time to time. To this end, a flush valve 5 is arranged in the recirculation path 4 upstream of the recirculation fan 23. Liquid water contained in the anode gas is removed beforehand with the aid of a water separator 22 arranged upstream of the flush valve 5 in the recirculation path 4.

In the present case, nitrogen-enriched anode gas discharged via the flush valve 5 is introduced into the cathode waste gas path 8 via a flush path 7 and is released to the environment together with the cathode waste gas. This removes not only nitrogen but also hydrogen from the recirculation path 4. The composition of the gas mixture present in the cathode waste gas path 8 is monitored with the aid of a sensor 6, the sensor 6 measuring the hydrogen content of the gas mixture in the present case. To this end, the sensor 6 is arranged in a position in the cathode waste gas path 8 in which cathode waste gas and anode gas from the recirculation path 4 are admitted thereto. Knowing the amount of anode gas in the gas mixture, it is accordingly possible to derive the hydrogen content of the anode gas from the hydrogen content of the gas mixture. Knowing the hydrogen content of the anode gas, it is possible to control the flushing of the recirculation path 4 in line with what is required. In this way, the number of flushing operations can be reduced to a minimum, so that hydrogen consumption drops and the range of the vehicle increases.

As an alternative to the position depicted, the sensor 6 can also be arranged in the recirculation path 4 or in the flush path 7. Since only anode gas is admitted thereto, determination of the hydrogen content does not first require determination of the proportion of anode gas in a gas mixture. This simplifies the method. However, it is not possible to rely on a sensor 6 possibly already present.

Irrespective of the arrangement of the sensor 6, the fuel cell system 1 further comprises a control device 10 which is data-transmittingly connected to the sensor 6, so that the data transmitted by the sensor 6 can be evaluated with the aid of the control device 10. Further preferably, the control device 10 is connected to the flush valve 5 via a control line, so that it can activate or open the flush valve 5 if the evaluation reveals that the hydrogen content of the anode gas is falling short of a specified limit value.

The invention claimed is:

1. A method for operating a fuel cell system (1), the method comprising:
   supplying a hydrogen-containing anode gas to a fuel cell (2) via an anode gas path (3),
   recycling the hydrogen-containing anode gas exiting from the fuel cell (2) via a recirculation path (4), wherein a flush valve (5) arranged in the recirculation path (4) is opened and the recirculation path (4) is flushed for reduction of a proportion of nitrogen contained in the anode gas, and
   providing the hydrogen-containing anode gas to a waste gas turbine (14) arranged in a cathode waste gas path (8) directly connectable to the recirculation path (4) via the flush valve (5) in a flush path (7) or indirectly connectable to the recirculation path (4) via the flush path (7), wherein a hydrogen content of the hydrogen-containing anode gas is determined with the aid of a sensor (6) and is used as a control variable in controlling the flushing of the recirculation path (4).

2. The method as claimed in claim 1, wherein the hydrogen content of the hydrogen-containing anode gas is determined with the aid of the sensor (6) arranged in the recirculation path (4) or in the flush path (7) connectable to the recirculation path (4) via the flush valve (5).

3. The method as claimed in claim 1, wherein the hydrogen content of the hydrogen-containing anode gas is determined with the aid of the sensor (6) arranged in the cathode waste gas path (8).

4. The method as claimed in claim 3, wherein a gas mixture consisting of cathode waste gas and the hydrogen-containing anode gas from the recirculation path (4) is admitted to the sensor (6), and a proportion of the hydrogen-containing anode gas in the gas mixture is determined for determination of the hydrogen content of the hydrogen-containing anode gas.

5. The method as claimed in claim 4, wherein a molar mass of the hydrogen-containing anode gas is derived from a pressure difference between a pressure in the recirculation path (4) and a pressure in the cathode waste gas path (8), the flow cross section of a cathode waste gas path (8) and a temperature in the cathode waste gas path (8) for determination of the proportion of hydrogen-containing anode gas in the gas mixture.

6. The method as claimed in claim 4, wherein the proportion of cathode waste gas is determined for determination of the proportion of hydrogen-containing anode gas in the gas mixture, wherein a molar mass of the cathode gas is derived from a current operating point and a set and/or measured air mass supplied to the fuel cell (2) via a cathode gas path (9).

7. The method as claimed in claim 1, wherein the hydrogen content of the hydrogen-containing anode gas is determined at regular time intervals.

8. The method as claimed in claim 1, wherein the wind gas turbine (14) supports an electric motor (15) for driving a compressor (13) arranged in a cathode gas path (9).

9. A control device (10) configured to execute a method as claimed in claim 1.

* * * * *